Aug. 3, 1943.   E. KELLY ET AL   2,325,997
SUBSOIL BREAKER
Filed Sept. 17, 1941
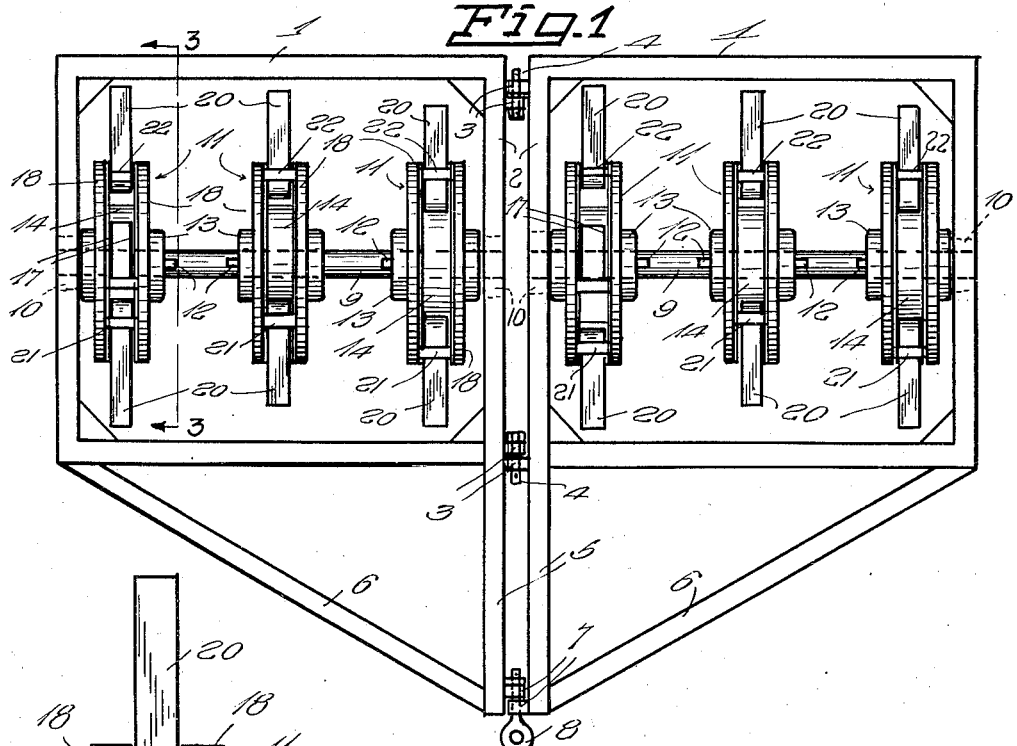
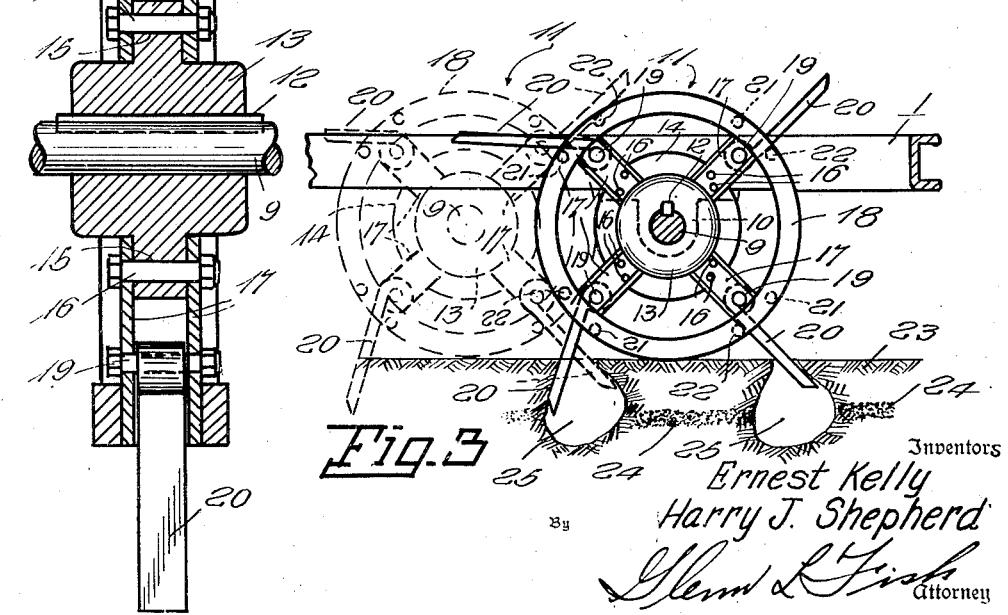
Inventors
Ernest Kelly
Harry J. Shepherd
By
Glenn L. Fish
Attorney Patented Aug. 3, 1943

2,325,997

UNITED STATES PATENT OFFICE 2,325,997

SUBSOIL BREAKER

Ernest Kelly and Harry J. Shepherd, Spokane, Wash.; said Shepherd assignor to said Kelly Application September 17, 1941, Serial No. 411,234

2 Claims. (Cl. 97—52)

This invention relates to agricultural machines and more particularly to a subsoil machine.

When fields are plowed year after year, the furrows are of substantially the same depth and eventually a hard compact layer of soil is formed under the top soil which is known as a plow-pan or hard-pan. Water cannot readily penetrate this hard-pan and, therefore, the roots of growing crops do not receive the proper amount of moisture and, in addition, rain water will be held above the hard-pan and quickly evaporate or run off the land and cause the top soil to be carried away by erosion during hard rains.

Therefore, one object of the invention is to provide a subsoil machine of such construction that the hard-pan may be penetrated and formed with spaced openings through which water may pass.

Another object of the invention is to provide a machine consisting of a frame adapted to be drawn across a field and having wheels which not only serve as rotatable supports for the frame but also carry ground-penetrating members serving to puncture the hard-pan as the machine moves across the field.

Another object of the invention is to provide the wheels with earth penetrating members so mounted that they may have limited tilting movement circumferentially of the wheels during rotation of the wheels and enter and leave the ground in such a manner that pockets filled with loose earth will be formed through the top soil and the hard-pan during use of the machine.

Another object of the invention is to provide the machine with wheels having hubs serving as weights for forcing the penetrating members or spades through the soil as the machine moves across a field.

Another object of the invention is to provide a machine of this character having frames so connected that they may tilt relative to each other and thus conform to the contour of the ground over which the machine moves.

The invention is illustrated in the accompanying drawing, in which:

Fig. 1 is a top plan view of the subsoil machine.

Fig. 2 is a sectional view taken vertically through one of the wheels thereof.

Fig. 3 is a view on the line 3—3 of Fig. 1.

This machine preferably has two frames 1 having confronting side bars 2 provided with hinge ears 3 through which pins 4 are passed to hingedly connect the frames and permit them to have tilting movement relative to each other and conform to surface irregularities of the ground over which the machine moves during use thereof. Arms 5, which may be continuations of the side bars 2, extend from the frames forwardly thereof and are braced by diagonally extending bracing bars 6 extending between front ends of the arms and outer front corner portions of the frames. At their front ends the arms carry hinge ears 7 to receive the shank of an eye bolt 8, thus hingedly connecting front ends of the arms and also providing a shackle with which a tractor or draft animals may be connected for drawing the machine forwardly across a field. While it has been stated that the machine preferably has two frames, it will be understood that any number of frames may be employed.

The frames are of duplicate construction and each has an axle 9 mounted in bearings 10 carried by the side bars of the frame. The axle extends the full width of the frame and carries a number of wheels 11 which are spaced from each other longitudinally of the axle and are secured to the axle by keys 12 which engage in registering grooves formed in the axle and the hubs 13 of the wheels. These hubs are elongated and of such diameter that they are very heavy and may serve as weights for holding the wheels in engagement with the ground, it being understood that, if necessary, additional weights may be mounted upon the axle between the wheels. An annular flange 14 surrounds the hub and is formed with circumferentially spaced openings 15 through which bolts 16 are passed to secure spokes 17 to the flange. The spokes extend radially from the hub and have their outer end portions welded or otherwise fixed to inner side faces of rings 18 which constitute an open rim for the wheel. Bolts 19 pass through the companion spoke-forming strips or bars 17 adjacent inner peripheries of the rim-forming rings 18 and constitute pivot pins for the inner ends of bars 20 which serve to penetrate the hard-pan and may be referred to as spades or penetrating members. The penetrating members are of appreciable length and project outwardly from the open rim between the rings 18 and also between the abutment bars or blocks 21 and 22 which extend transversely between the rings and, at their ends, are welded to inner surfaces of the rings. These bars or blocks limit swinging movement of the penetrating members and guide movement thereof into and out of the ground, and, referring to Fig. 3 of the drawing, it will be seen that, as the wheels turn, their penetrating members will be driven into the ground and pass through the top soil 23 and also through the hard-pan 24 formed by repeated plowing. It will thus be seen that, at spaced intervals, the ground will be formed with pockets 25 through which rain water may pass and enter the ground under the hard-pan. While the pockets have been shown empty, it is to be understood that this has been done in order to more clearly emphasize the shape of the pockets and provide contrast between the pockets and the rest of the ground. In reality, these pockets are filled with lumps of dirt which are formed when the soil is broken up by the spades 20 and drop back into the pockets.

In view of the fact that the spades or penetrating bars enter the ground in spaced relation to each other, the machine may be employed as a cultivator for orchards, alfalfa fields, hay meadows, or the like, without damaging trees or growing vegetation.

Having thus described the invention, what is claimed is:

1. A subsoil breaker comprising a frame, an axle rotatably mounted in said frame transversely thereof, a supporting wheel carried by said axle and having a long thick hub constituting a weight for the wheel, an annular flange carried by said hub midway its length and extending radially therefrom, spokes secured against opposite side faces of said flange in opposed relation to each other and extending radially therefrom, said spokes having flat inner and outer side faces, rings fixed to outer side faces of outer ends of said spokes and constituting an open rim for the wheel, penetrating members pivotally mounted between pairs of spokes and extending outwardly through the open rim and being of a length adapting them to enter the ground and penetrate top soil and a hard-pan during turning of the wheel, and abutment members mounted between said rings with the spokes and the penetrating members located between them and constituting means for bracing the rings and limiting tilting movement of the penetrating members.

2. A subsoil breaker comprising a frame, a wheel rotatably mounted in said frame and having a hub, pairs of spokes extending radially from said hub, the spokes of each pair being directly opposed and spaced from each other longitudinally of the hub, rings mounted against outer side faces of outer end portions of said spokes and spaced transversely from each other to provide an open rim, ground-penetrating members pivoted between the spokes of each pair and extending outwardly through the open rim and tiltable circumferentially of the wheel, and bars for bracing the rings and limiting tilting movement of the penetrating members extending between the rings adjacent outer ends of the spokes and secured at their ends to the rings.

ERNEST KELLY.
HARRY J. SHEPHERD.